United States Patent Office 3,199,718
Patented Aug. 10, 1965

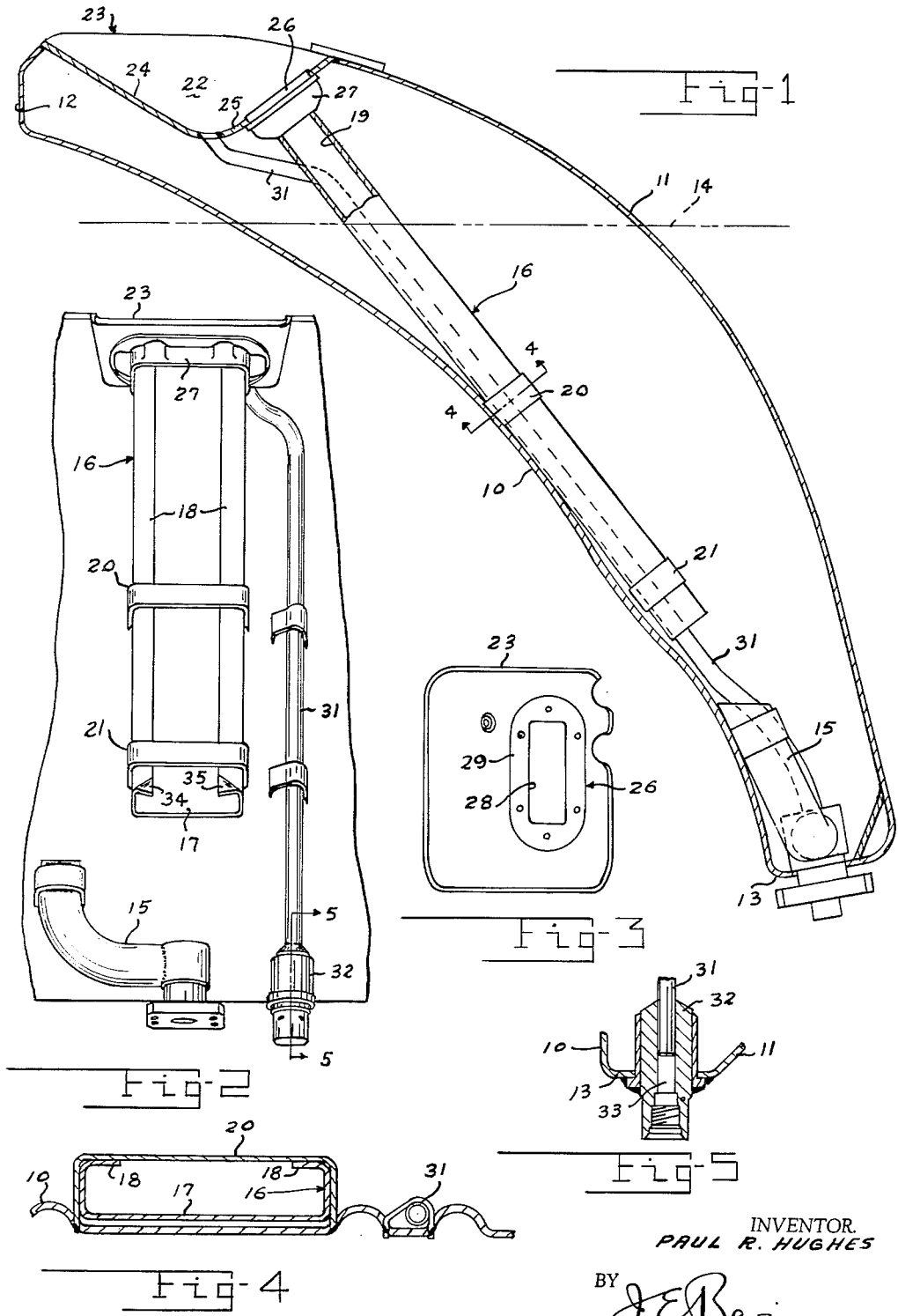

3,199,718
LIQUID STORAGE TANK
Paul R. Hughes, Englewood, Ohio, assignor to United Aircraft Products Inc., Dayton, Ohio, a corporation of Ohio
Filed Sept. 10, 1963, Ser. No. 307,823
3 Claims. (Cl. 220—85)

This invention relates to liquid storage tanks and particularly to means for mounting a liquid level sensor therein.

An object of the invention is to adapt storage tanks as described, particularly liquid level tanks of arcuate configuration as used in conjunction with aircraft engines, to receive a liquid level sensor in an advantageously disposed position.

Another object of the invention is to provide a sensor mounting in a tank as described adapted readily to receive and securely to hold a sensor instrument and which is itself simple and securely installed in the tank.

A further object of the invention is to install a sensor mount as described in a manner to obviate protrusion of the parts thereof relative to the tank and to obviate misoperation of the sensor due to shorting or the like.

Other objects and structural details of the invention will appear from the following description, when read in connection with the accompanying drawing, wherein:

FIG. 1 is a partly diagrammatic view in longitudinal section of a liquid storage tank embodying a sensor mount in accordance with the instant invention, structural parts of the tank unrelated to the sensor mount being in the main omitted;

FIG. 2 is a fragmentary view in front elevation of the interior of the tank of FIG. 1, showing the sensor mount and associated parts;

FIG. 3 is a detail fragmentary view looking down upon the tank, showing a cup comprised in the open upper end of the sensor mount;

FIG. 4 is a detail view in cross-section taken substantially along the line 4—4 of FIG. 1; and FIG. 5 is a detail view taken substantially along the line 5—5 of FIG. 2.

Referring to the drawing, the invention is concerned with liquid storage tanks, particularly tanks used in aircraft to store oil for engine lubrication, hydraulic and like purposes. In the operation of the system or systems of which the tank is a part oil is withdrawn from the tank, used and returned to the tank for storage and reuse, the oil supply being subject to depletion by consumption and by loss from system damage or misoperation.

Means to sense and remotely to indicate the changing liquid level are, desirably, a part of such tanks. The instant invention provides a mounting means for such a sensor simplifying its installation and removal and providing for its advantageous positioning within the tank.

As illustrated, a tank to which the invention is applicable is arcuate in configuration having, as viewed from the exterior, a concave back wall 10 and a convex front wall 11. At opposite ends the walls 10 and 11 are united by integral end walls 12 and 13. While the tank of the illustrated instance may in use assume different attitudes relative to the earth's surface it is normally disposed to place front wall 11 in a generally overlying relation to concave wall 10 with a top portion of the tank closed by end wall 12 and a bottom portion closed by end wall 13. A normal liquid level within the tank is indicated by the broken line 14.

Walls 10 and 11, along with the end walls 12 and 13 and side closures not illustrated, make up the skin or shell of the tank. The contained body of liquid is drawn upon by means including an outlet fitting 15 in the bottom portion of the tank, the oil being circulated exteriorly of the tank under pressure and returned thereto for reuse. The changing liquid level is suitably monitored, a part of the monitoring means being, in the present instance, a probe or sensor installed in the tank to be a semi-permanent part thereof.

The instant mounting for such probe comprises a generally rectangular channel shaped part 16 made of sheet metal or the like and disposed in generally vertical fashion in the tank between the inner and outer or back and front walls 10 and 11. The part 16 comprises a flat member 17 the sides of which are turned upward and then bent inward toward one another as edges 18. The result is as noted to define a channel shaped part closed on one side and partly open on the other. The structure provides a longitudinal through passage 19 rectangular in configuration and opening at its opposite ends through the part 16. The arrangement accordingly furnishes a slideway, represented by part 16, whereby a suitably dimensioned probe or sensor may be received and partly confined in the tank, with oil therein having access to the probe through the open lower extremity of the slideway and through the partly open side thereof. The slideway 16 is straight as contrasted to the arcuate configuration of the tank. Its one end projects a substantial distance into the bottom portion of the tank. Its opposite or upper end projects through and beyond the normal liquid level 14 into the top portion of the tank. Intermediate its ends the slideway is seated upon or has a bearing on the interior face of concave wall 10. A strap 20 overlies part 16 at the location of its bearing upon wall 10 and is welded or otherwise secured at its ends to the wall 10. One or more additional straps 21 may be suitably disposed to overlie the partly open side of the slideway and to be secured to the opposite side edges thereof, the arrangement being one to assist in confining the sensor within the slideway without limiting free access of the oil thereto.

The upper end of the slideway 16 terminates adjacent to and in partly underlying relation to a cavity or depression 22 in the upper tank shell. In the illustrated instance such depression is formed by cutting an opening in the front convex wall 11 near top end wall 12 and installing therein a recessed cup member 23, as by welding. The cup member 23 has a downwardly sloping wall 24 terminating in an outwardly projected wall 25. The latter is disposed approximately at right angles to the slideway 16 and has an opening therein in which is a fitting 26. The fitting 26 has an inwardly extending boss portion 27 receiving and interengaged with slideway 16, and is formed further with a through opening 28 aligned with and forming a continuing part of through opening 19 in part 16. The fitting 26 has a flange 29, mounting the fitting to the cup 23 and by which a head portion of a sensor device may be mounted to the fitting, with sensing portions of the instrument projecting through opening 28 and downward within opening 19 in slideway 16 into contact with the contained oil. Cavity 22 provides a recessed area within which the head of the sensor, and mounting devices therefor, may be accommodated in a non-projecting relation to the shell of the tank.

The juncture of walls 24 and 25 of cup 23 represents the low point of cavity 22, with the fitting 26 being somewhat elevated relative thereto. Introduced into the cavity at such low point is one end of a tube 31, such tube extending downwardly through the tank interior along side the slideway 16 and being received at its other end in a fitting 32 installed in bottom end wall 13 and having a through opening to the exterior of the tank shell. The arrangement is one providing a continuously open drain, obviating an accumulation of water or other moisture in cavity 22.

In the use of the sensor mounting device, it will be understood that the sensor instrument, conventionally formed as a probe at the end of electrical conductors, is inserted through cup opening 28 into the slideway 16 and moved longitudinally therein until the head of the sensor seats on flange 29 whereupon the sensor is secured in place. Slideway 16 provides a protected but accessible mounting for the probe and tends to hold it yieldingly in an adjusted, installed position. In this latter sense, lower extremities of the side edges 18 of slideway 16 are bent inward as tabular detents 34 and 35 exerting a spring action upon an installed probe to hold in yieldingly against withdrawal or against relative longitudinal movement in the tank despite changes in the attitude thereof.

The wall 10 and 11 may be formed with beads for strengthening purposes as shown in FIG. 4.

What is claimed is:

1. In a liquid storage tank of arcuate configuration having top and bottom portions and providing a back concave wall and in spaced approximately parallel relation thereto a front convex wall, means forming a depression in said convex wall in the top portion of the tank, said depression being comprised of a downwardly sloping wall in a plane intermediate said concave and convex walls and an outwardly projecting wall extending from said sloping wall to said convex wall, and a level sensor mounting slideway in said tank opening at one end through the said outwardly projecting wall of said depression and terminating at its other end within the tank in the bottom portion thereof, said slideway being straight and having an intermediate portion bearing on an interiorly facing surface of said concave wall, said other end of said slideway being formed with tabular detents inturned at angles less than right angles and made resilient for spring action.

2. A liquid storage tank according to claim 1, characterized in that said slideway comprises a fitting having a rectangular through opening therein installed in the bottom of said depression and comprises further a rectangular elongated part, channel-like in configuration, having a closed lower side bearing on said concave wall and a partly open upper side formed by turned over marginal edges, one end of said part and said fitting being joined together to make of said part a continuation of the opening in said fitting.

3. In a liquid storage tank of arcuate configuration having top and bottom portions and providing a back concave wall and in spaced approximately parallel relation thereto a front convex wall, means forming a depression in said convex wall in the top portion of the tank, said depression being comprised of a downwardly sloping wall in a plane intermediate said concave and convex walls and an outwardly projecting wall extending from said sloping wall to said convex wall, a level sensor mounting slideway disposed longitudinally in said tank between said back and front walls, said slideway comprising a fitting installed in the said outwardly projecting wall of said depression and having an opening therethrough to the interior of the tank and further comprising a straight hollow part joined at its one end to said fitting to act as a continuation of the opening therein and extending at its other end into the bottom portion of the tank, an intermediate portion of said part bearing on said concave wall, and means for holding said part to said concave wall.

References Cited by the Examiner

UNITED STATES PATENTS

| | | | |
|---|---|---|---|
| 1,105,420 | 7/14 | Green | 248—300 X |
| 1,590,980 | 6/26 | Lamb | 217—60 |
| 2,550,897 | 5/51 | Wilson | 33—126.7 |
| 2,907,206 | 10/59 | O'Neil | 73—425.4 X |
| 3,049,138 | 8/62 | Klank | 220—85 X |

FOREIGN PATENTS 695,444  12/30  France.

THERON E. CONDON, *Primary Examiner.*